H. F. CONLIE.
KRAUT CUTTER.
APPLICATION FILED AUG. 3, 1915.

1,170,963.

Patented Feb. 8, 1916.

Witnesses
A. G. Hague
Will Freeman

Inventor
H. F. Conlie
by Orwig & Bair Attys

UNITED STATES PATENT OFFICE.

HENRY F. CONLIE, OF CENTRALIA, ILLINOIS.

KRAUT-CUTTER.

1,170,963.  Specification of Letters Patent.  Patented Feb. 8, 1916.

Application filed August 3, 1915. Serial No. 43,488.

*To all whom it may concern:*

Be it known that I, HENRY F. CONLIE, a citizen of the United States, and resident of Centralia, in the county of Marion and State of Illinois, have invented a certain new and useful Kraut-Cutter, of which the following is a specification.

The object of my invention is to provide a kraut cutter of simple, durable and inexpensive construction.

A further object is to provide a kraut cutter adapted to cut cabbage into small particles.

A further object is to provide a kraut cutter so constructed and arranged that the heads of cabbage may be fed through a cylinder and the cabbage cut by the operation of spiral knives, and by fixed knives at the discharge end of the cutting receptacle.

A further object is to provide a kraut cutter of the type mentioned having a longitudinal shaft and having knives formed on the machine at the discharge end thereof, said knives forming a support for a bearing for one end of the shaft, said knives being adapted to complete the cutting of the cabbage.

Figure 1:
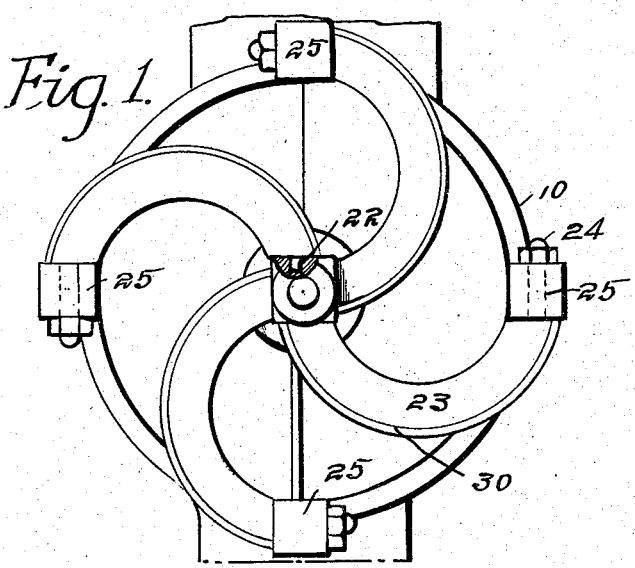
Figure 2:
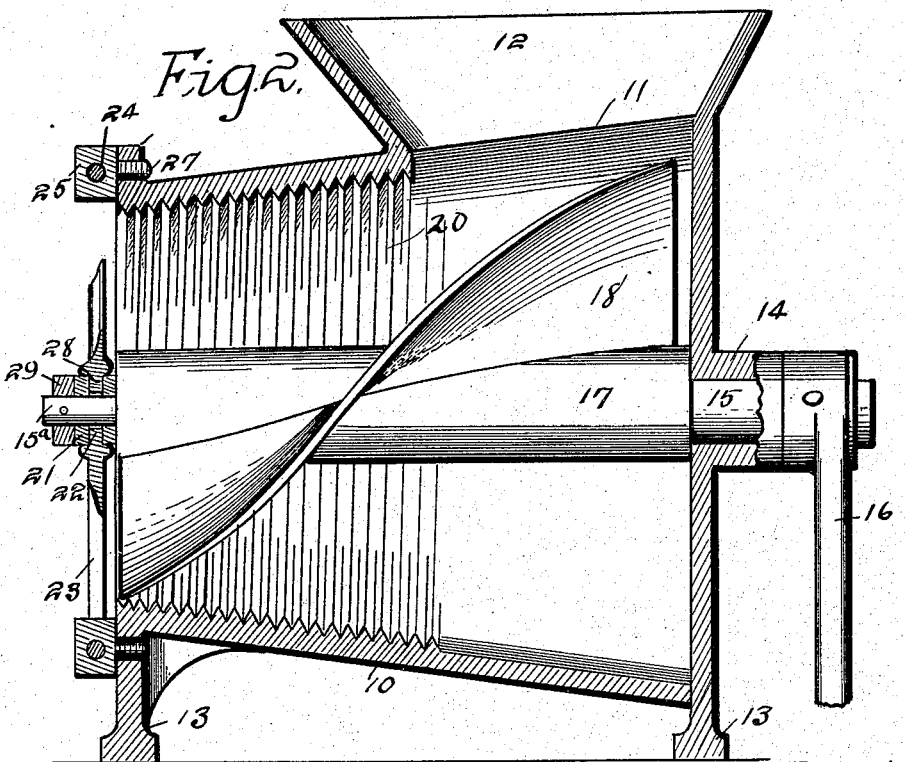

My invention consists in the construction, arrangement and combination of the various parts of the device whereby the objects contemplated are attained as hereinafter more fully set forth, pointed out in my claim and illustrated in the accompanying drawings, in which:

Figure 1 shows a front end elevation of my improved kraut cutter, and Fig. 2 shows a longitudinal vertical sectional view through the same.

In the accompanying drawings, I have used the reference numeral 10 to indicate generally a casing 10 preferably tapered from its forward end and is provided with the upper part of its larger end with an opening 11 to which cabbage may be fed through the hopper 12. Suitable supporting members 13 are provided. Formed on the larger end of the casing 10 is a bearing 14 for a shaft 15, which extends longitudinally through the machine. On the outer end of the shaft 15 is an ordinary handle 16. The forward end of the shaft 15 is reduced in size at 15$^a$. A sleeve 17 is mounted on the shaft 15 within the casing 10 and on the sleeve 17 is a spirally arranged knife 18. The interior of the casing 10 from the opening 11 to the discharge end of the casing is provided with a plurality of comparatively wide grooves 20 adapted to coact with the knife 18 in cutting the cabbage.

The forward end of the shaft 15 is supported in the following manner: Mounted on the end 15$^a$ is a bearing 21 having a plurality of sockets 22. Detachably mounted on the casing 10 at the discharge end thereof is a plurality of curved knives 23. The knives 23 are provided at their outer ends with cylindrical projections 24 extended through suitable openings in blocks 25. The blocks 25 are secured to a flange 26 on the discharge end of the casing 10 by means of screws 27. Formed on the inner ends of the knives 23 are small extensions 28 received in the sockets 22. It will be seen that by means of the bearing 21 and the knives 23 the forward end of the shaft 15 is properly supported in position for rotation. On the outer end of the shaft portion 15$^a$ is a washer 29. The knives 23 are curved preferably on an arc of a circle or half the diameter of the casing 10 at the discharge end and the sharp edges 30 of the knives are on the outer edges thereof. The knife 18 is so arranged as to cause the cabbage to be moved against the knife and cut or shaved on the sharp edges 30 of the fixed curved knife blades 23.

In the practical operation of my improved kraut cutter, the cabbage heads are fed to the cylinder 12 to the interior of the casing. The particles of cabbage are forced into the grooves 20 which assist in cutting the cabbage into more uniform size. At the discharge end of the casing 10, the spiral knives 18 force the cabbage against the blades 23, and complete the cutting operation. The blades 23 support the shaft 15.

It will be noted that while my device is of considerable larger size than the ordinary meat cutter or the like it is of simple construction, and requires fewer parts than any ordinary cutter of this general type, so that my machine may be made at a comparatively small expense.

It will be understood that some changes may be made in the construction and arrangement of the parts of my improved kraut cutter without departing from its essential features and purposes, and it is my intent to cover by this application any such changes which may be included within the scope of my claims.

I claim as my invention:

In a device of the class described, a hollow tapered casing open at one end, a hopper above and communicating with the larger end thereof, a shaft extended longitudinally through the casing, a spirally arranged cutting knife on said shaft, a bearing on the end of said shaft at the open end of the casing having sockets, a plurality of curved knives having their outer ends detachably mounted on the open end of the casing and their inner ends mounted in said sockets for supporting said shaft.

Des Moines, Iowa, July 23, 1915.

HENRY F. CONLIE.

Witnesses:
J. J. REICHENBACH,
ALVA PETREA.